United States Patent Office 3,563,018
Patented Feb. 16, 1971

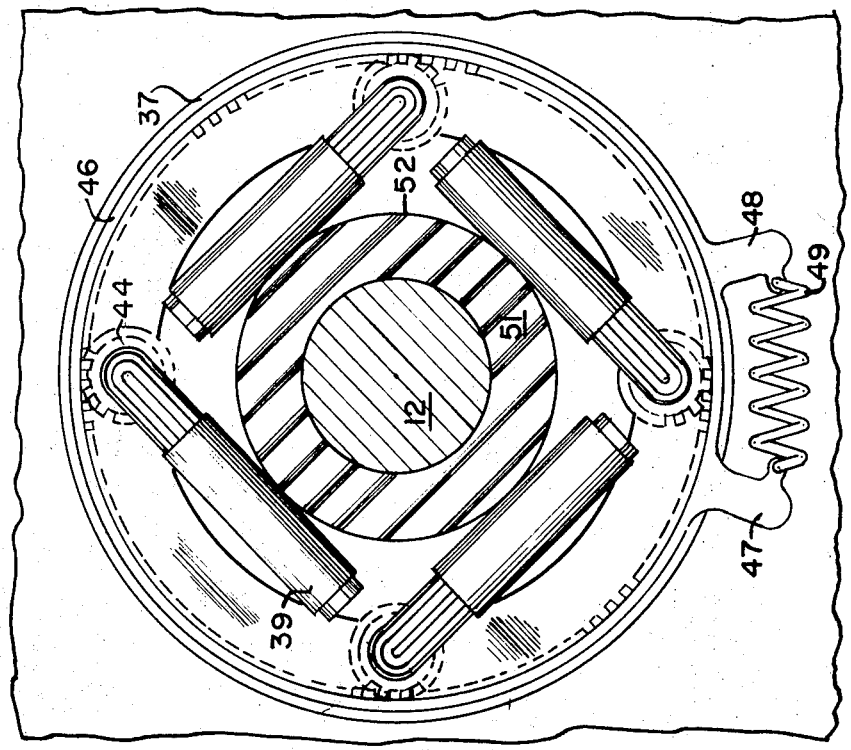
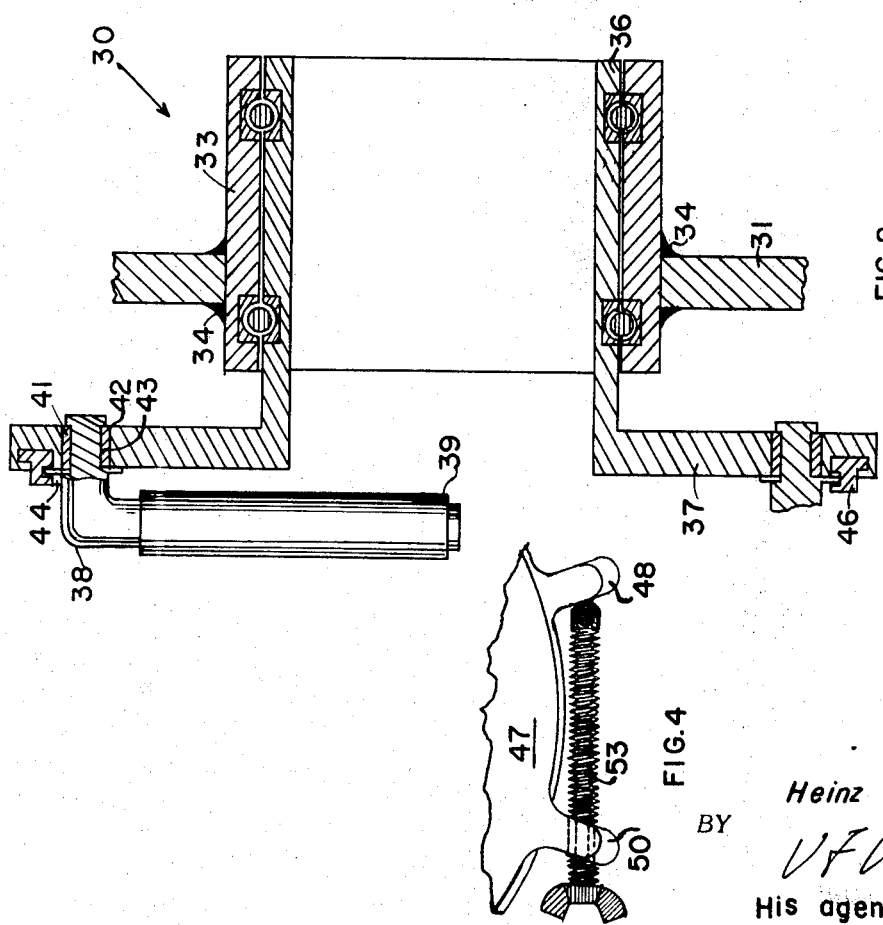

3,563,018
WINDING MACHINE GUIDE
Heinz Lutjen, Yonkers, N.Y., assignor to Anaconda Wire and Cable Company, a corporation of Delaware
Filed Mar. 20, 1969, Ser. No. 808,919
Int. Cl. B65h 81/08
U.S. Cl. 57—15                                                9 Claims

ABSTRACT OF THE DISCLOSURE

In a machine for winding tapes or other strands around an advancing core, a guide for the core is non-rotating and is mounted to the rotating frame of the machine by means of a low-friction bearing.

BACKGROUND OF THE INVENTION

In the manufacture of electrical cables a conductor is advanced horizontally through a tape-winding machine which applies a large plurality of layers of paper insulating tape helically to build up a thick layer of electrical insulation. The tapes are supplied in the form of flat pads and the winding machine comprises a rotating frame that mounts the pads and rotates them around the conductor. Tapes are paid off and wound helically, first around the conductor, and then around the core comprising the conductor surrounded by previously applied tapes. In the type of winding machine to which the present invention is directed, the core does not rotate but means must be provided for supporting it accurately in its proper position during its advance through the rotating members of the machine. This has generally been done in one of two ways. Wooden bushings are inserted in the machine to rotate with it around the core which they support, or the core is supported in non-rotating bushings mounted on stationary standards. Where the bushings rotate around the core they constitute a source of abrasion and must be very accurately fitted to the diameter assumed by the core at the point of application. A good many bushings of different sizes must be provided. These bushings should be split so that they can be changed, if necessary, without cutting the core, and the discontinuity in split bushings provides an additional source of possible damage when the bushing rotates. When non-rotating bushings are used, the required standards add significantly to the length of the taping machine and add to the complexity of the driving mechanism, since the rotating elements must be separated from each other to allow for the standards.

Oversize bushings result in "core whip," broken tapes, irregularity of the butt spaces between turns of tape, uneven tape tension, and paper damage. The efforts to ameliorate these problems frequently takes the form of slower operating speed, which, of course, has its own obvious commercial disadvantage.

SUMMARY OF THE INVENTION

In a winding machine of the type comprising a rotating support surrounding an advancing core and rotatingly supporting at least one strand being helically wound around the core, I have invented the improvement comprising bearing means, such as a ball-bearing bushing, mounted on the support, and guide means, such as means comprising a plurality of rollers adjustable around the axis of advancing of the core, for the core. The guide means are restrained from free rotation relative to the core by frictional engagement with the core. Advantageously, my guide means may comprise a hollow stub shaft fitting within the bushing, a flange fixedly mounted on the stub shaft, a plurality of rollers adjustably mounted on the flange so as to support the core and also spring means urging the guide means against the core. The rollers may advantageously, be mounted on cantilevered pins and my improvement comprises pinion means fixed to the pins, and ring-gear means engaging the pinion means.

A more thorough understanding of my invention may be gained from the appended drawing.

BRIEF DESCRIPTION OF THE DRAWING

FIG. 1 shows a front view of my improvement with the core in section.

FIG. 2 shows a sectionalized side view of my improvement with the core omitted.

FIG. 4 shows an alternate embodiment of an element of FIG. 1.

DETAILED DESCRIPTION OF A PREFERRED EMBODIMENT

Figure 3:
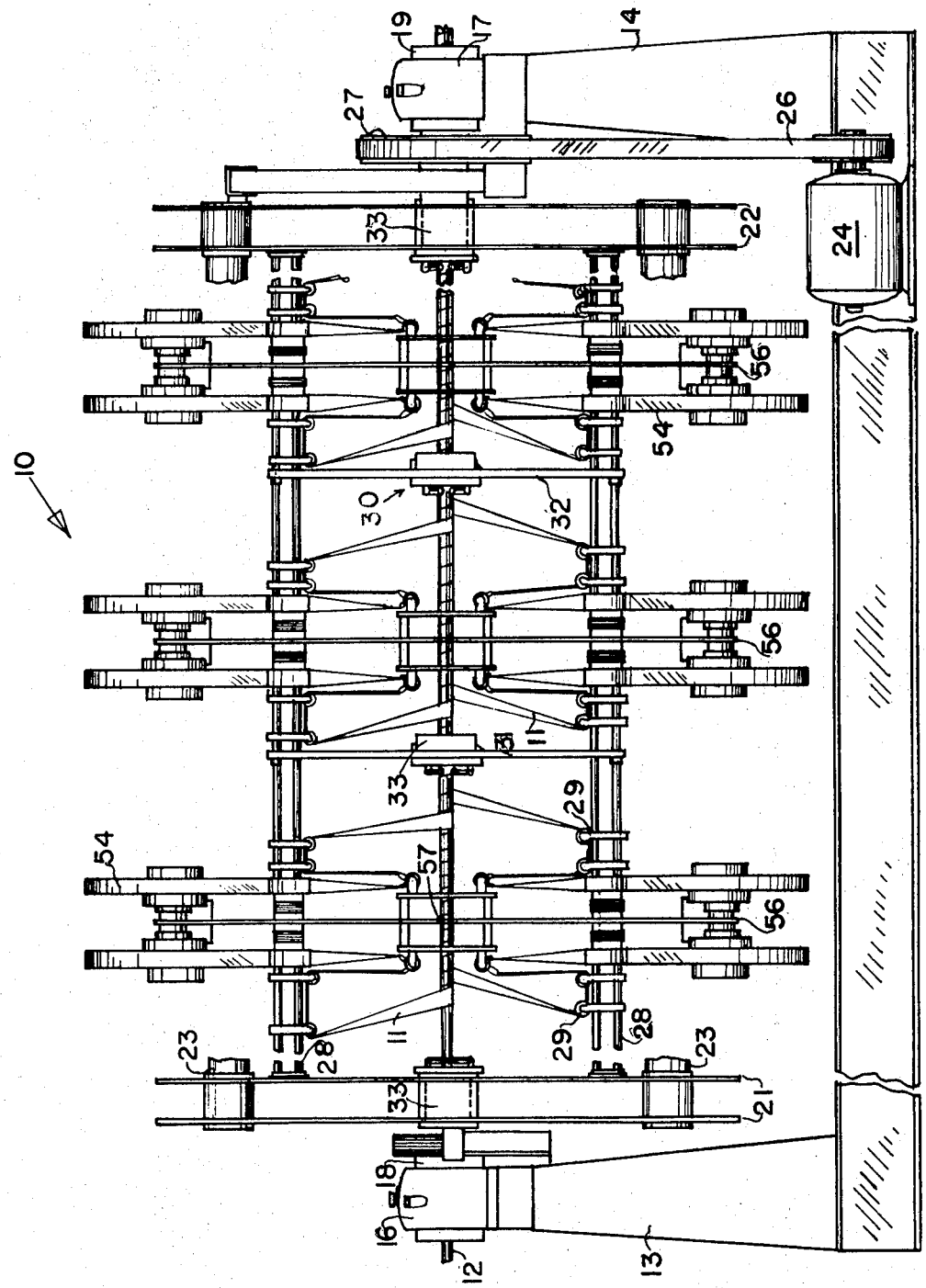
FIG. 3 shows a side view of a winding machine comprising my invention.

Referring first to FIG. 3, a winding machine indicated generally by the numeral 10 is used to apply tapes 11 helically around a conductor 12 of indefinite length advancing from a supply of said conductor, not shown. The machine 10 comprises standards 13, 14 for respective bearings 16, 17 in which are rotated hollow stub shafts 18, 19 mounted to pairs 21, 22, of end plates held rigidly together with tubular ties 23. The plate forming the pairs 21, 22 are circular in shape and there are six of the ties 23 equally spaced around them to form a very strong and rigid rotating frame driven by a motor 24 through a chain 26 and sprocket 27.

Tie rods 28 serve as supports for tape guides 29 and also support mounting plates 31, 32 for core supports indicated generally by the numeral 30 having bushings 33 (FIG. 2) held to the plates by welds 34. Additional of the bushings 33 are mounted on the end plate pairs 21, 22.

Freely rotatable within the bushing 33 a stub shaft 36 supports a flange 37 on which are mounted four bent pins 38 cantilevered to support rollers 39. A reduced length 41 of each of the pins 38 is rotatably inserted in a bore 42 of the flange 37 having a lubricated bushing 43. Toothed collars 44 sweated or otherwise firmly fixed to the pins 38 mesh with a ring gear 46. Lugs 47, 48 projecting respectively from the ring gear 46 and flange 37 are urged together by a tension spring 49.

The tapes 11 build up a wall 51 around the conductor 12 to form a core 52 which increases in size as more layers of tapes 11 are added. The action of the spring 49 keeps the rollers 39 pressed against the core 52 so as to support the core and center it in the machine 10. By tapping the lug 47 at 50 and substituting a threaded swivel pin 53 for the spring 49 (see FIG. 4) the position of the rolls 39 can be fixed to accommodate different core diameters. Other means, within the scope of my invention, for mounting the rolls 39, adjusting their position and urging them against the core 52 may be adopted by persons having mechanical skills.

Pads 54 of the tape 11 are mounted on plates 56, firmly fixed to the tubular ties 23, and are rotated bodily around the core 52, paying off tape as they rotate. To operate the machine with my improvement the conductor 12 is threaded through the shaft 18 and the bushing 33 mounted on the plate pair 21. It is also threaded through a central aperture 57 of the first of the plates 56 and thence through the bushing 33 mounted on the first of the plates 31. A typical taping machine will comprise eight of the plates 56 with the tape pads supported by them and seven of the intermediate plates 31, each with a core support 30. The conductor 12 is threaded through all of these and forward through the shaft 19.

The tapes 11 are strung through their appropriate guides 29 and fixed by adhesive tape to the conductor 12 with the front end of the conductor connected by means of a lead line over a pulling capstan, not shown. The machine is operated at low speed while the rollers 39 of each of the core supports 30 adjust to the increase in core size until an initial length of conductor has passed through the machine. Where the embodiment shown in FIG. 4 is employed, the threading is done with the rollers set in an open position and then each of the core supports 30 is manually adjusted after the passage of one length of conductor through the machine. The speed of the machine is then increased to operating speed with each of the bushings 33 rotating with the machine frame but the shafts 36 and their flanges 37 being restrained from rotation by the frictional contact between the rollers 39 and the core 52. The weight of the lugs 47, 48 and spring 49 at the bottom of the flange 37 also tends to prevent the shaft 36 from rotating and dead weights can be added to the bottom of the flange 37 if it is found that some rotation does occur because friction, to some degree, exists in the bearing.

I have invented a new and useful improvement in winding machines of which the foregoing description has been exemplary rather than definitive and for which I desire an award of Letters Patent.

I claim:
1. In a winding machine of the type comprising a rotating support surrounding an advancing core, and rotatingly supporting at least one strand being helically wound around said core, the improvement comprising:
 (A) bearing means mounted on said support, and
 (B) guide means for said core, said guide means being supported by said bearing means to be freely rotatable relative to said support, said guide means being restrained from free rotation relative to said core by frictional engagement therewith.

2. The improvement of claim 1 wherein said bearing means comprises a ball-bearing bushing mounted on said rotating support.

3. The improvement of claim 2 wherein said guide means comprises a hollow stub shaft fitting within said bushing, a flange fixedly mounted on said shaft, and a plurality of rollers adjustably mounted on said flange so as to support said core.

4. The improvement of claim 3 comprising spring means urging said guide means against said core.

5. The improvement of claim 3 comprising cantilevered pins mounting said rollers, pinion means fixed to said pins, gear means engaging said pinion means, and spring means urging said gear means so as to urge said rollers against said core.

6. The improvement of claim 2 comprising spring means urging said guide means against said core.

7. The improvement of claim 1 wherein said guide means comprises a plurality of rollers adjustable around the axis of advancing of said core.

8. The improvement of claim 7 comprising spring means urging said guide means against said core.

9. The improvement of claim 1 comprising spring means urging said guide means against said core.

References Cited

UNITED STATES PATENTS

| | | | |
|---|---|---|---|
| 2,588,525 | 3/1952 | Hertenstein, Jr. | 57—13 |
| 3,183,583 | 5/1965 | Ostermann | 57—13X |
| 3,234,721 | 2/1966 | Carter | 57—13 |

JOHN PETRAKES, Primary Examiner

U.S. Cl. X.R.

57—106